July 3, 1928.
J. E. SPRAIN
SAFETY HOOK
Filed July 21, 1927
1,676,167
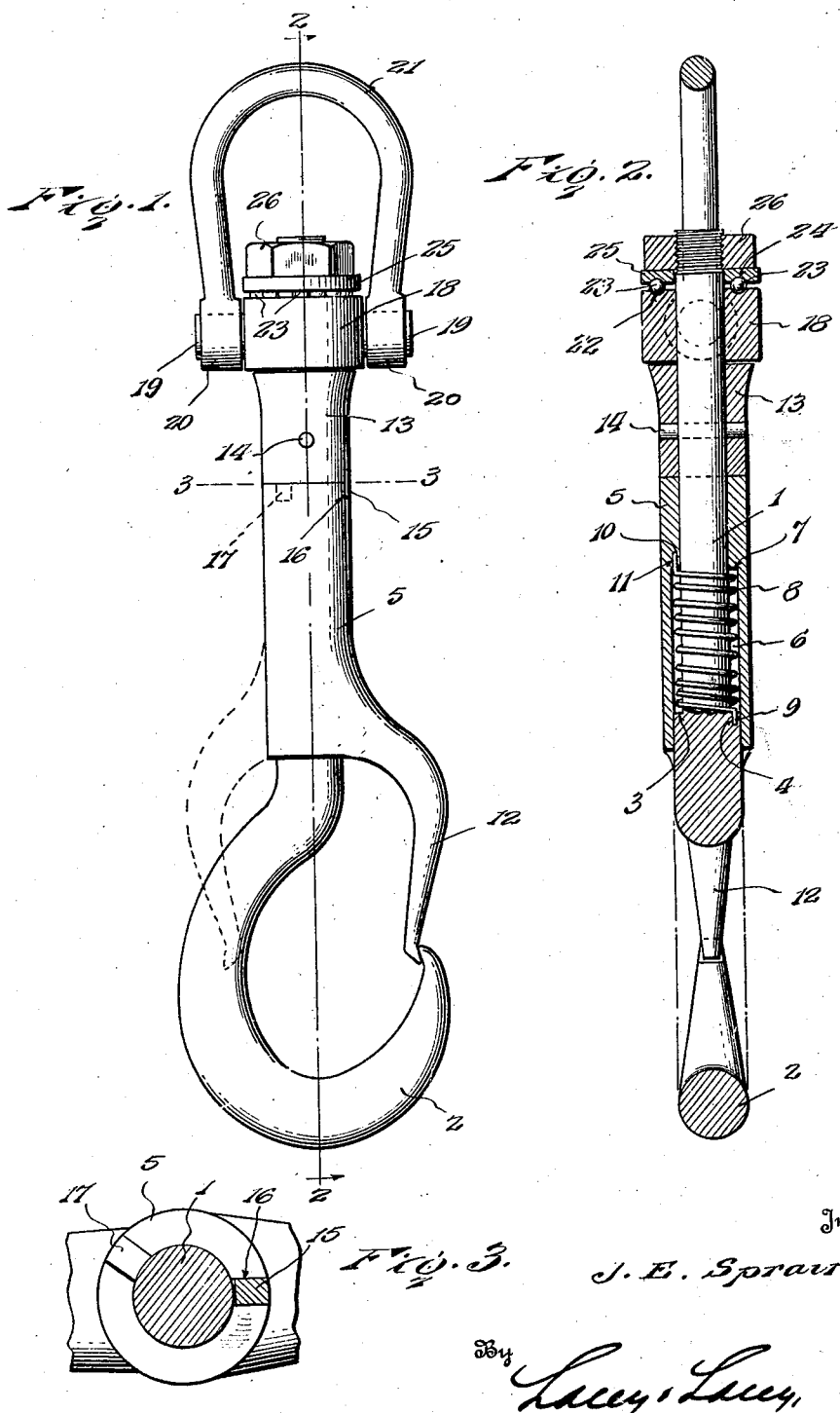
Inventor
J. E. Sprain.
By Lacey & Lacey, Attorneys Patented July 3, 1928.

1,676,167

UNITED STATES PATENT OFFICE.

JOSEPH E. SPRAIN, OF SMACKOVER, ARKANSAS, ASSIGNOR TO VICKERS MACHINE WORKS, OF SMACKOVER, ARKANSAS.

SAFETY HOOK.

Application filed July 21, 1927. Serial No. 207,471.

This invention relates to an improved hook for use in connection with oil well drilling apparatus, and one object of the invention is to provide a hook having an improved latch by means of which an article engaged by the hook may be prevented from accidently slipping out of engagement therewith.

Another object of the invention it to so mount the latch that it may be releasably held in either an open or a closed position and provide a spring which will yieldably retain the latch closed and cause it to be releasably interlocked with a collar carried by the shank of the hook when in either a closed or an open position.

Another object of the invention is to permit the latch to be rotated upon the shank of the hook from a closed to an open position and allow an article to be easily engaged with the bill of the hook when the latch is opened without engagement of the article with the bill of the hook being interfered with by the latch.

Another object of the invention is to provide a hook of this type which will be very strong and durable and which may be very easily taken apart when it is necesary to repair or replace any of its parts.

The invention is illustrated in the accompanying drawings, wherein

Figure 1 is a view showing the hook in side elevation, the open position of the latch being indicated by dotted lines;

Fig. 2 is a longitudinal sectional view through the hook taken on the line 2—2 of Fig. 1, and Fig. 3 is a transverse sectional view through the shank of the hook on the line 3—3 of Fig. 1.

The improved hook is preferably formed of steel, although any other strong metal may be employed and includes a shank 1 having one end portion bent to form a bill 2 which tapers towards its free end, as shown in Figs. 1 and 2. The portion of the shank adjacent the bill is of greater diameter than the remainder of the shank thereby providing an annular shoulder 3 and this thickened portion of the shank is formed with a recess 4 constituting a seat, the purpose of which will be hereinafter set forth.

The latch which serves to retain a cable or other article in engagement with the bill of the hook consists of a sleeve 5 also formed of metal which fits upon the shank and is slidably and rotatable thereon. By referring to Fig. 2, it will be seen that the upper end portion of the bore of the sleeve is of such diameter that the sleeve fits snugly upon the shank, whereas the lower portion of its bore is of sufficient diameter to snugly receive the thickened lower portion of the shank. Therefore, a chamber 6 is formed within the sleeve having a shoulder 7 at its upper end. Within the chamber 6 is disposed a spiral spring 8 which is coiled about the shank and has one end portion bent to form a finger 9 anchored in the seat 4 and its other end bent to form a similar finger 10 anchored in a seat 11 which leads from the shoulder 7. By this arrangement the spring will be firmly engaged with the sleeve and the shank of the hook and will yieldably resist turning of the sleeve in a direction to swing its arm 12 from the closed position shown in Figs. 1 and 2 to the open position indicated by dotted lines in Fig. 1. The collar 13 which fits upon the shank above the sleeve 5 and is secured by a pin 14 passed through the collar and shank has its lower end formed with a depending lug 15 and the upper end of the sleeve is provided with recesses or seats 16 and 17 spaced from each other circumferentially of the sleeve and of such size that they may snugly receive the lug of the collar. It will be readily seen that, when the lug is seated in the recess 16, the latch will be securely held in the closed position and cannot turn upon the sleeve beyond a position which will dispose the free end of its arm close to the free end of the bill 2 of the hook. When it is desired to open the latch, the sleeve is slid longitudinally upon the shank away from the collar against the action of the spring and is then turned to swing the arm 12 to the position indicated by dotted lines in Fig. 1. When in this position, the recess 17 will be disposed beneath the lug and by allowing the sleeve to be forced towards the collar by expansion of the spring the lug will be caused to enter the recess 17 and securely hold the latch in the open position. Therefore, the latch may be securely but releasably held in either an open or a closed position. When it is desired to again close the latch, it is merely necessary to slide the sleeve away from the collar a sufficient distance to move the lug out of the recess 17 and the spring can then return the latch to its normal position and the lug will again enter the recess 16 and hold the latch closed.

The hook is to be suspended from a cable or other suitable support or carrier, and in order to do so I have provided a yoke 18 which fits loosely upon the shank above the collar 13 and is provided with side arms 19 received in bearings 20 formed at the ends of a U-shaped shackle 21. A bearing race 22 is formed in the upper surface of the yoke 18 to receive bearing balls 23 and these balls are engaged in a companion race 24 formed in the under surface of a disk 25 which fits upon the shank and is held in place by a securing nut 26. The nut 26 is screwed upon the threaded free end portion of the shank, as shown in Fig. 2, and if so desired may be suitably locked upon the shank so that it cannot accidentally work loose.

Having thus described the invention, I claim:

1. A snap hook comprising a shank, a bill at one end of said shank, a collar carried by said shank, a sleeve rotatable upon said shank and slidable thereon towards and away from the collar, an arm extending from said sleeve to engage the free end of said bill, the sleeve and collar having adjacent ends provided one with a lug and the other with circumferentially spaced seats to receive said lug and releasably secure the sleeve in a set position, and resilient means yieldably retaining said sleeve in a normal position with its arm engaged with said bill.

2. A snap hook comprising a shank, a bill at one end of said shank, a collar carried by said shank, a sleeve rotatable upon said shank and slidable thereon towards and away from the collar, an arm extending from said sleeve to engage the free end of said bill, the sleeve and collar having adjacent ends provided one with a lug and the other with circumferentially spaced seats to receive said lug and releasably secure the sleeve in a set position, and a spring coiled about said shank within said sleeve with one end anchored to the sleeve and its other end anchored to the shank, said spring serving to yieldably hold the sleeve in interlocked engagement with the collar and normally retain the sleeve against rotation with its arm engaged with the bill.

3. A snap hook comprising a shank, a bill at one end of said shank, a collar carried by said shank, a sleeve rotatable upon said shank and slidable thereon towards and away from the collar, an arm extending from said sleeve to engage the free end of said bill, the sleeve and collar having adjacent ends provided one with a lug and the other with circumferentially spaced seats to receive said lug and releasably secure the sleeve in a set position, an annular shoulder upon said shank, an annular shoulder in said sleeve spaced from the shoulder of said shank, and a spring coiled about said shank within the sleeve with its end portions bearing against the shoulders and anchored thereto whereby the spring may serve to yieldably hold the sleeve in interlocked engagement with the collar and normally retain the sleeve against rotation with its arm engaging the free end of said bill.

In testimony whereof I affix my signature.

JOSEPH E. SPRAIN. [L. S.]